US012705308B1

(12) United States Patent
Micaelian

(10) Patent No.: US 12,705,308 B1
(45) Date of Patent: Aug. 11, 2026

(54) COMPUTERIZED CLASSIFICATION SYSTEM WITH DYNAMIC VARIABLE AND CONSTRAINT ADJUSTMENT AND FUNCTION ASSIGNMENT

(71) Applicant: Fadi Victor Micaelian, Menlo Park, CA (US)

(72) Inventor: Fadi Victor Micaelian, Menlo Park, CA (US)

(73) Assignee: Viteds, LLC, Menlo Park, CA (US)

( * ) Notice: Subject to any disclaimer, the term of this patent is extended or adjusted under 35 U.S.C. 154(b) by 565 days.

(21) Appl. No.: 16/799,822

(22) Filed: Feb. 24, 2020

Related U.S. Application Data

(60) Provisional application No. 62/808,885, filed on Feb. 22, 2019.

(51) Int. Cl.

| | |
|---|---|
| ***G06N 20/10*** | (2019.01) |
| ***G06F 18/24*** | (2023.01) |
| ***G06N 3/02*** | (2006.01) |
| ***G06N 3/063*** | (2023.01) |
| ***G06N 3/084*** | (2023.01) |

(52) U.S. Cl.
CPC ............... *G06F 18/24* (2023.01); *G06N 3/02* (2013.01); *G06N 3/063* (2013.01); *G06N 3/084* (2013.01); *G06N 20/10* (2019.01)

(58) Field of Classification Search
CPC .......... G06N 20/10; G06N 3/02; G06N 3/063; G06N 3/084
See application file for complete search history.

(56) References Cited

U.S. PATENT DOCUMENTS

| | | | | |
|---|---|---|---|---|
| 10,867,247 | B1 * | 12/2020 | Teig | G06N 3/084 |
| 2018/0144214 | A1 * | 5/2018 | Hsieh | G06T 7/0002 |
| 2020/0134461 | A1 * | 4/2020 | Chai | G06N 3/088 |
| 2020/0184327 | A1 * | 6/2020 | Dey | G06N 3/086 |

OTHER PUBLICATIONS

Yang, T. J., Chen, Y. H., & Sze, V. (2017). Designing energy-efficient convolutional neural networks using energy-aware pruning. In Proceedings of the IEEE conference on computer vision and pattern recognition (pp. 5687-5695). (Year: 2017).*

Diehl, P. U., Neil, D., Binas, J., Cook, M., Liu, S. C., & Pfeiffer, M. (Jul. 2015). Fast-classifying, high-accuracy spiking deep networks through weight and threshold balancing. In 2015 International joint conference on neural networks (IJCNN) (pp. 1-8). IEEE. (Year: 2015).*

* cited by examiner

*Primary Examiner* — Kamran Afshar
*Assistant Examiner* — Lokesha Patel
(74) *Attorney, Agent, or Firm* — Appleton Luff

(57) ABSTRACT

A classification engine comprises a plurality of processing layers, each with a processing node that performs a selected function which comprises a utility function. The processing nodes comprise multiple types of utility functions. The classification receives features corresponding to an entity to be classified and provides a classification result. The processing nodes in the processing layers other than the first processing layer weight the inputs. The engine automatically adjusts the weights and the functions in the processing nodes to improve the classification.

18 Claims, 6 Drawing Sheets

Identify node and incoming edges and respective weights 302
Repeat for each layer 304
Repeat for each node in layer 306

Repeat for each edge 308
Ignore edge 312
No
Determine incoming edge relevance
310
Complete all edges
Yes
Identify originating data source (object) 314
Identify from function library most relevant function based on matching objects 316
120

COMPUTERIZED CLASSIFICATION SYSTEM WITH DYNAMIC VARIABLE AND CONSTRAINT ADJUSTMENT AND FUNCTION ASSIGNMENT

CROSS-REFERENCE TO RELATED APPLICATIONS

This application claims priority to U.S. application 62/808,885 filed on Feb. 22, 2019, which application is hereby incorporated by reference in its entirety.

FIELD OF THE DISCLOSURE

This disclosure relates generally to the field of data processing systems and more particularly to computational systems for classification.

BACKGROUND

Artificial Intelligence (AI) and Machine Learning (ML) systems are now commonly used to recognize and to classify certain patterns in data. For example, AI/ML systems are increasingly used for image recognition, such as to recognize a certain object in an image (doc, cat, human face) or in voice recognition to recognize spoken words to permit voice enabled inputs to a computer system. Other common uses for AI/ML are e-mail systems, to detect unwanted email (e.g. spam), and on-line advertising systems, to match advertising content to content being displayed to a user. A specific technique in AI/ML systems is the use of Deep Neural Networks (DNNs) which use multiple layers to progressively extract higher level features from the raw input. For example, in image processing, lower layers may identify edges, while higher layers may identify the concepts relevant to a human such as digits or letters or faces. Deeper networks generally permit better feature extraction but require more data with a concomitant increase in processing power and/or time.

Current AI/ML techniques, including those employing DNNs tend to require relatively large amounts of data to adequately train the model. This can be a significant limiting factor in instances where large amounts of data are not available. For example, the necessary data may not have been collected. Or the data may have been collected by an entity but may not be available for any particular AI/ML application due to restrictions on distribution and usage of the data, such as may be imposed by various regulations. Such regulations include those that govern medical and health related data, financial data and other personally identifiable data. Also, the reliance of current AI/ML techniques on training via existing data tends to limit their usability to inputs that are within the boundaries of the data on which the AI/ML engine is trained. The accuracy of current AI/ML techniques diminishes greatly when encountering data that is outside the boundaries of the training data. This greatly limits the ability of such systems to discover new solutions.

Current AI/ML engines employ a number of processing nodes, each of which is programmed to perform a classical statistical normalization function, such as Rectified Linear Unit (ReLU) or Hyperbolic Tangent Function (TAN H). These functions can detect patterns and based on these patterns the AI/ML engine can cluster the results and classify them. Such functions are however generic statistical functions which have no pertinence to the underlying context of the application. As a result, there is no way to trace the "logic" of the AI/ML engine to understand the process by which a particular result was provided. For example, if a conventional AI/ML engine is applied to DNA information for example to assess a patient's cancer risk, it may be able, assuming sufficient data, to classify patients and provide a score that reflects a particular patient's risk of getting a particular type of cancer. However, such an engine cannot explain why a given individual has greater chances to get cancer. Is it because of the genetic disposition, is it because of the consumption of a combination of drugs, is it because of the long exposure to radiation, etc. or a combination of these factors?

In view of the foregoing, it can be seen that there is a need for improved computerized classification systems.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically.

DETAILED DESCRIPTION

In the following detailed description, reference will be made to the accompanying drawings, in which identical functional elements are designated with like numerals. Elements designated with reference numbers ending in a suffix such as .1, .2, .3 are referred to collectively by employing the main reference number without the suffix. For example, 100 refers to topics 100.1, 100.2, 100.3 generally and collectively. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. It is to be understood that both the foregoing and the following descriptions are exemplary and explanatory only and are not intended to limit the claimed invention or application thereof in any manner whatsoever. The following detailed description is, therefore, not to be construed in a limited sense.

Current AI/ML systems face several challenges including a dependency on data, and in many cases a very large amount of data. Moreover, current AI/ML models mimic past behavior and thus are not effective at predicting new behavior that is outside the bounds of the data in the training set. Moreover, currently implemented systems require that the outcome be labeled upfront. In other words when setting up an AI/ML system it is necessary to predetermine the possible outcome, thus making the system pre-deterministic and unable to discover new solutions. Finally, current AI/ML systems, act as a black box. While they may be trained to be effective at classifying data it is not possible with such systems to understand how they came to their conclusion with respect to a particular output.

The reason traditional AI/ML engines cannot provide any insight is that they act as a black box. Typically, such engines use classical statistical normalization functions such as ReLU and TAN H. These functions are good at detecting patterns and based on these patterns the engine can cluster the results and classify them. But the statistical functions employed have no pertinence to the business or real case rules.

Figure 1:
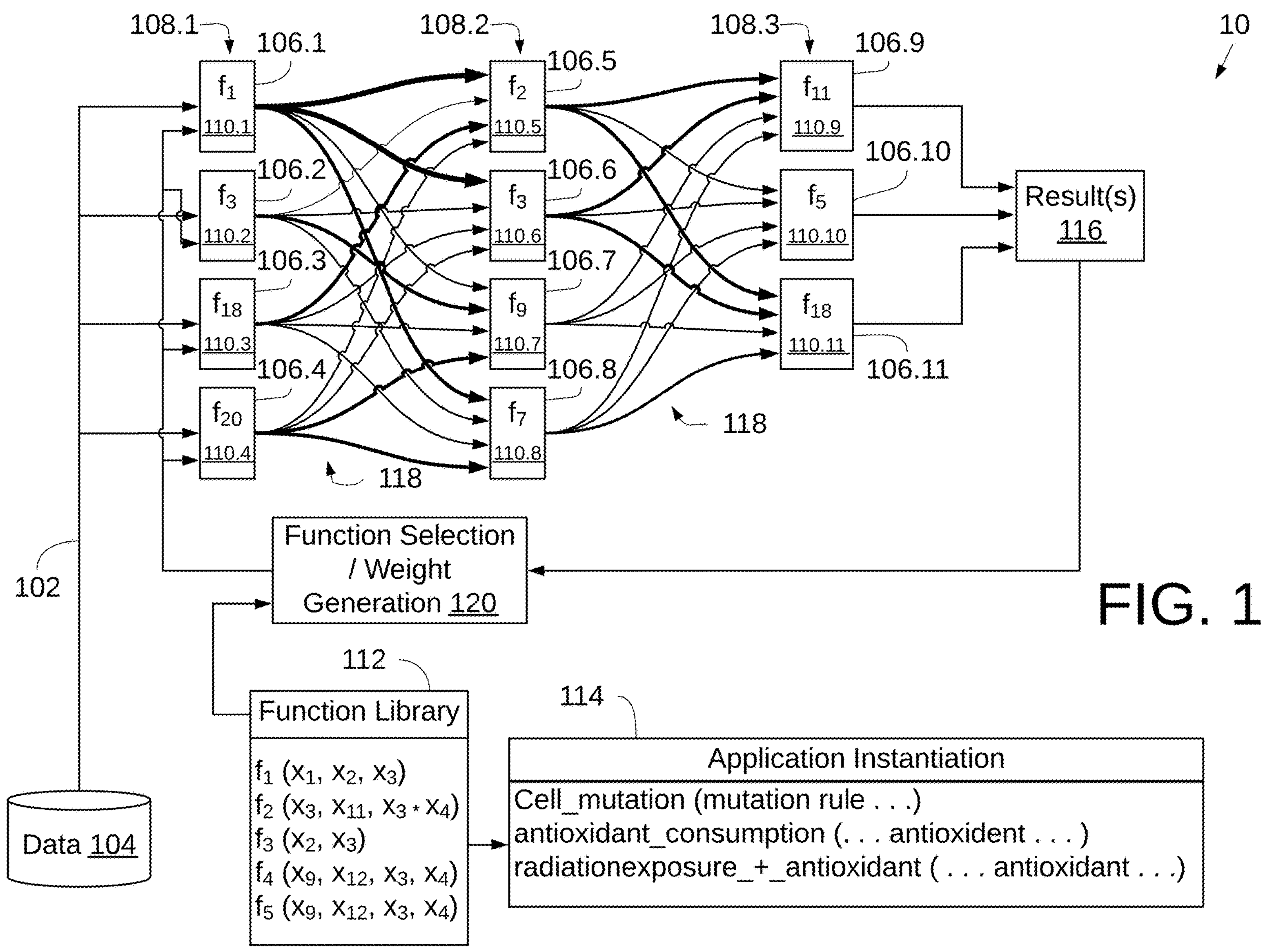
FIG. 1 is a high-level block diagram of an embodiment of a machine learning system embodying the principles described herein.

The disclosed ML system, an embodiment of which is shown in FIG. 1 is capable of not only of performing classification of inputted data but also of providing the reasoning underlying the classification decision. For example, classifying a patient's risk of cancer and why the particular patient has a greater risk of cancer. In the following description reference is made to neural networks but the disclosed system in is not limited to use of neural networks. Other techniques, such as Closest Neighbor (KNN) or Support Vector Machine (SVM) may also be employed.

Turning to FIG. 1, ML system 10 processes inputs 102 that are drawn from data storage 104. Four inputs 102 are shown for illustrative purposes. The system 10 may employ more or less inputs depending on the particular application. In a given application, each input 102 represents a different feature or criteria and the format of the input will vary depending on the particular application. For example, if the application for which the system 10 is to be used is for detecting likelihood of a patient contracting a particular disease, then the inputs 102 will include various characteristics of the patient, such as their age, weight, locations they have traveled to in the prior say, three months, and other characteristics, such as various aspects of their health history (which diseases have they contracted in the past), which vaccinations have they had, and also perhaps various aspects of their genetic history. As can be appreciated, the format of any input 102 may take the form of a simple binary input (yes/no, i.e. a single bit input) or may take the form of much more complex input such as a value that may span a large range of values. The input 102 need not be limited to a numerical value and can instead take a textual form such as a word or a phrase or a sentence or longer strings of text. The input 102 may also be an image, such as a picture of an individual, or an x-ray image or a map or a video. As seen, the type of input 102 can vary widely and is a function of the particular application and the types of functions selected for the system 10.

The inputs 102 are processed by a plurality of processing nodes 106 which are organized in processing layers 108 where each processing layer 108 includes one or more processing nodes 106 with each processing node 106 performing an assigned function 110. Three processing layers 108 (108.1, 108.2, 108.3) are shown in the embodiment of FIG. 1 for illustrative purposes. Certain applications may have as few as one processing layer 108 and other applications may have two, three (as shown) or more processing layers 108. Each function 110 represents a normalized mathematical function selected to represent a known relationship. Each function 110 takes the form of a utility function with a utility unit. For example, in one application, a function 110 may describe the physical impact radiation may have on triggering cancer. Another illustrative function 110 may explain how the consumption of a certain antidepressant, combined with heavy consumption of alcohol impact the cohesion of the cell and cause a mutation. Another function 110 may describe the impact radiation exposure has on certain cells. The functions are not limited to logic. Empirical data expressed as one or more function(s) may also be employed. Other examples include functions 110 that express the way a cell mutation occurs, or the correlation between cell mutation and exposure to harmful waves. Other functions 110 can express the attractiveness of various shipping methods, or the chances of correlation or impact of curing a disease with a combination of diet, medicine and exercise.

Where the source of a function is empirical data, it may be approximated using Fourier series or other approximation methods. In another instantiations a function can be obtained by transcribing the expert knowledge. This would typically generate rule-based functions. Another way of sourcing functions is through live user interactions. These are only some of the possible ways to generate the functions 110.

Generally, the functions 110 in the first processing layer 108.1 will be selected such that each function is largely influenced by one of the factors. For example, what is the correlation between height and how students perform in school. Another node would be the correlation between weight and how students perform in school. Another note would be the correlation between IQ and how students perform in school. Selection of the function for each node requires use of some knowledge about an outcome. Some functions may be known such as people who smoke cigarettes tend to get cancer. In the second and successive processing layers 108 weights are employed to cause some inputs to be more impactful than others. As seen, the functions are contextual as opposed to exhibiting purely a mathematical relationship that is separate from the context in which it is applied. Because the functions are logical functions their use reduces or and, in some cases, eliminates the need for the extensive training data required by conventional AI/ML systems.

As noted, each function 110 is normalized, in other words is scaled to be within a known range, such as between 0 and 1. There are different well-known techniques to perform such normalization, which is performed to not to impact the result of the next processing layer 108 and bias it towards one function 110.

The functions 110 disclosed herein have a known cause/effect relationship between the input and output. For example, a table mapping radiation amounts to percentage of causing cancer. Or a table correlating consumption of a certain antidepressant, combined with heavy consumption of alcohol to the cohesion of a cell and chances of causing a mutation. For example, the function:

$$f(x_1, x_2, x_3) = 2 \times x_1 + \ln x_2, x_3 - \frac{x_1}{x_2 + x_3}$$

may be represented by a table, a graph, or a mathematical function.

One example is shown at 114 where one function reflects the characteristics of cell mutation, one function reflects the effects of antioxidant consumption and another function reflects the effects of radiation exposure and antioxidant consumption. The function may be derived from data or may be captured from know how such as reflected in experimental studies. Use of such functions permits the system 10 to take advantage of all of the learning that has taken place in a particular field. For example, the disclosed system can use known relationships, such as the results of large-scale studies, on say heart disease (e.g., the Framingham study). In a conventional system, such studies would probably be used as a baseline by which the AI engine's training would be compared to determine if the engine is sufficiently trained. Whereas in the disclosed system, which may take the form of a computerized decision engine, the cause/effect gleaned from the studies would be used directly by the system 10.

Figure 2:
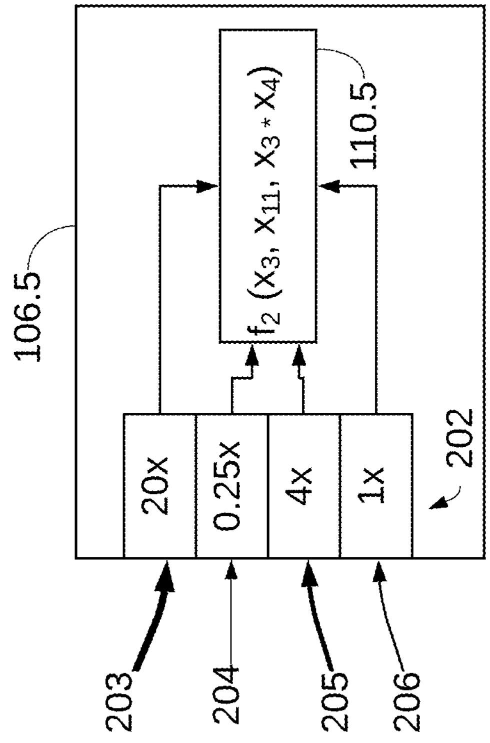
FIG. 2 shows details of a processing node of the machine learning system of FIG. 1.

In one embodiment, a separate function 110 is used at each processing node 106, and the function may vary depending on weights that are fed in the node, as shown in further detail in FIG. 2. Each processing node 106 may employ a weight factor 202 associated with each input to the processing node 106. As seen in FIG. 2, input 203 is weighted with a 20× weighting factor, input 204 is weighted with a 0.25× weighting factor, input 205 is weighted with a 4× weighting factor and input 206 is weighted with a 1× weighting factor (in other words input 206 is not weighted).

Turning back to FIG. 1, the weighting factors 202 shown in FIG. 2 are represented by the thickness of the lines 118 shown in FIG. 1. In the embodiment shown in FIG. 1, each processing node 106 in each processing layer 108 receives as an input the output of each processing node 106 from the prior processing layer 108. In some cases, a function 110 at a processing node 106 will not require a particular input and in such a case that particular input will be weighted to zero. In general, each successive processing layer will result in higher level feature processing and the processing nodes in later layers will in general employ more inputs, i.e. have fewer inputs weighted to zero.

Figure 3:
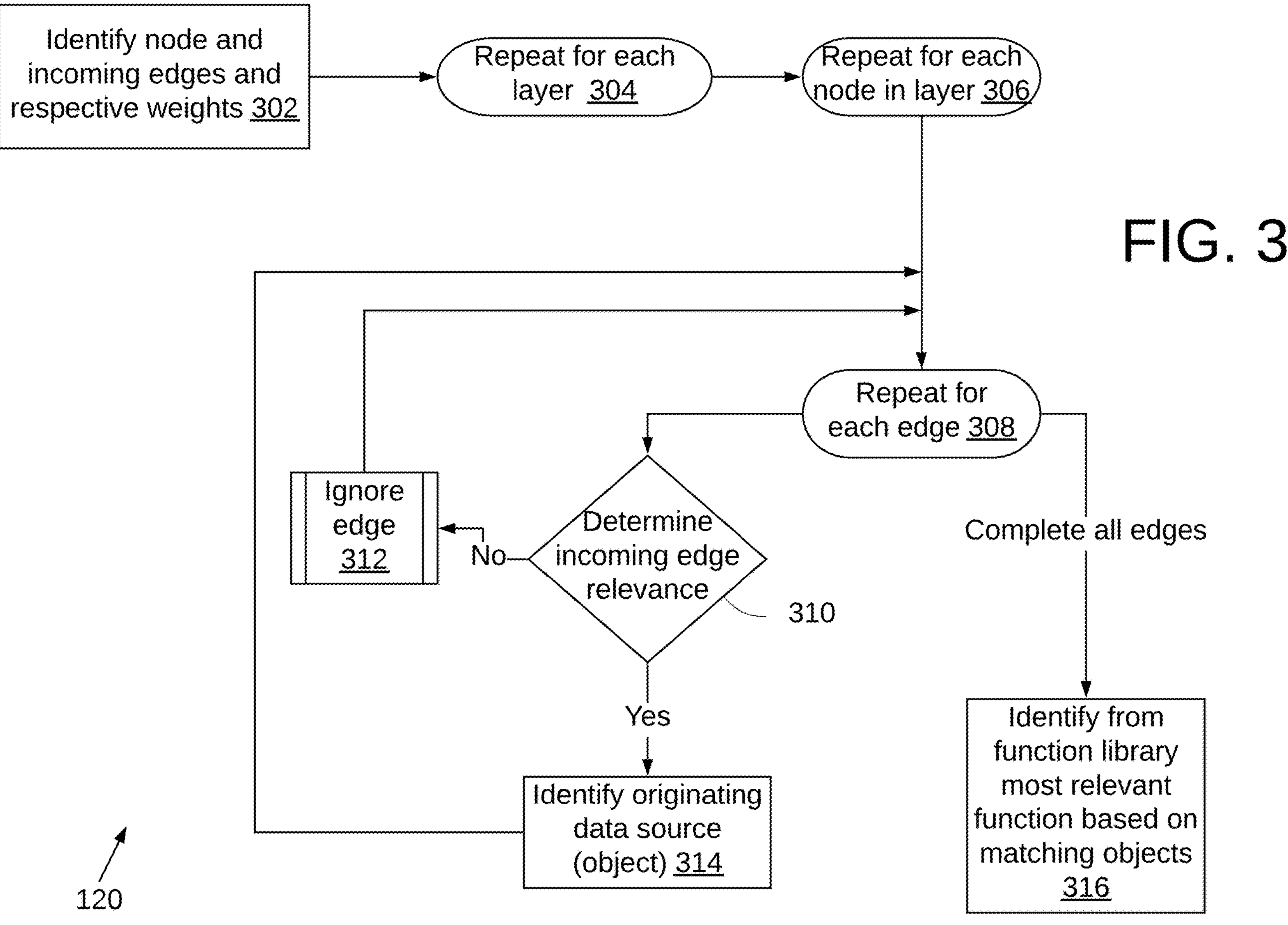
FIG. 3 is a flow diagram illustrating an embodiment of dynamic function assignment.

The functions 110 may in certain embodiments be dynamically assigned to each node from a library 112 of functions. Unlike conventional AI/ML engines where a single statistical function is applied to every node, the disclosed embodiment promotes the concept of a contextual function reflecting the particular situation. The functions 110 may be assigned to each processing node 106 manually or in another embodiment may be assigned dynamically by module 120 from the function library 112 as shown in FIG. 3. In certain embodiments, the function assignment may be performed manually upon each pass of inputs 102 through the system 10 to generate results 116. In another embodiment, the dynamic assignment module 120 may be employed to successively adjust the selected functions 110 at each processing node 106 and the associated weights 202 to permit the system 10 to iterate successively to generate results 116 from inputs 102. In a certain instantiation, the dynamic assignment may be based on the original key factors that impact the node. In other words, by tracing back all the links and their respective weighted contribution, the key factors are identified. Based on these factors, the function that best covers these factors is selected dynamically. The dynamic assignment may also be used to refine the model and enhance the predictions.

An embodiment of dynamic function assignment is seen in FIG. 3. At 302 a data structure is generated by identifying each function 110 at each processing node 106 along with the source of each input (also referred to as incoming edge 118) and the associated weight 202. As seen at 304 and 306, each processing layer 108 is processed and each processing node 106 in each processing layer 108 is processed by the processing steps 308, 310, 312, 314, and 316. In one embodiment, such processing is performed starting with processing layer 108.3 which receives the inputs 102 from the data source 104. For each edge (118), the incoming edge relevance is determined at 310 by comparing it to an adjustable edge relevance threshold value. The relevance of an edge 118 is a function of where in the allowable range the edge falls. For example, an edge 118 that represents weight may only be deemed to have sufficient relevance if the weight represented falls in the upper 10% of the allowable weight range, or the middle 20% or the bottom 5%. If the incoming edge has a relevance is greater than (and in some embodiments equal to) the adjustable edge relevance threshold value, then the incoming originating data source is identified and stored to a data structure at 314. If the incoming edge relevance is less than (and in some embodiments equal to) the adjustable edge relevance threshold value then the incoming edge 118 is ignored meaning that the impact of the incoming edge 118 is sufficiently low as to not affect the output of the particular function 110 at the processing node 106 in question. The result of processing of operations 308, 310, 312, and 314 is to in many cases to cause selection of different functions 106 for any given number of processing nodes 110. For example, for a function 106 that accepts four inputs, if one input is determined at 310 to be below (and in some embodiments equal to) the predetermined adjustable edge relevance threshold value then a different function will be selected by module 120 from function library 112 where the selected function is suited for the three remaining inputs that fall above (and in some embodiments are equal to) the predetermined adjustable edge relevance threshold value. The inputs 102 will again be processed by the resulting system 10 and the operations of FIG. 3 may be repeated. In many cases, a large number of iterations will not be required.

Figure 4:
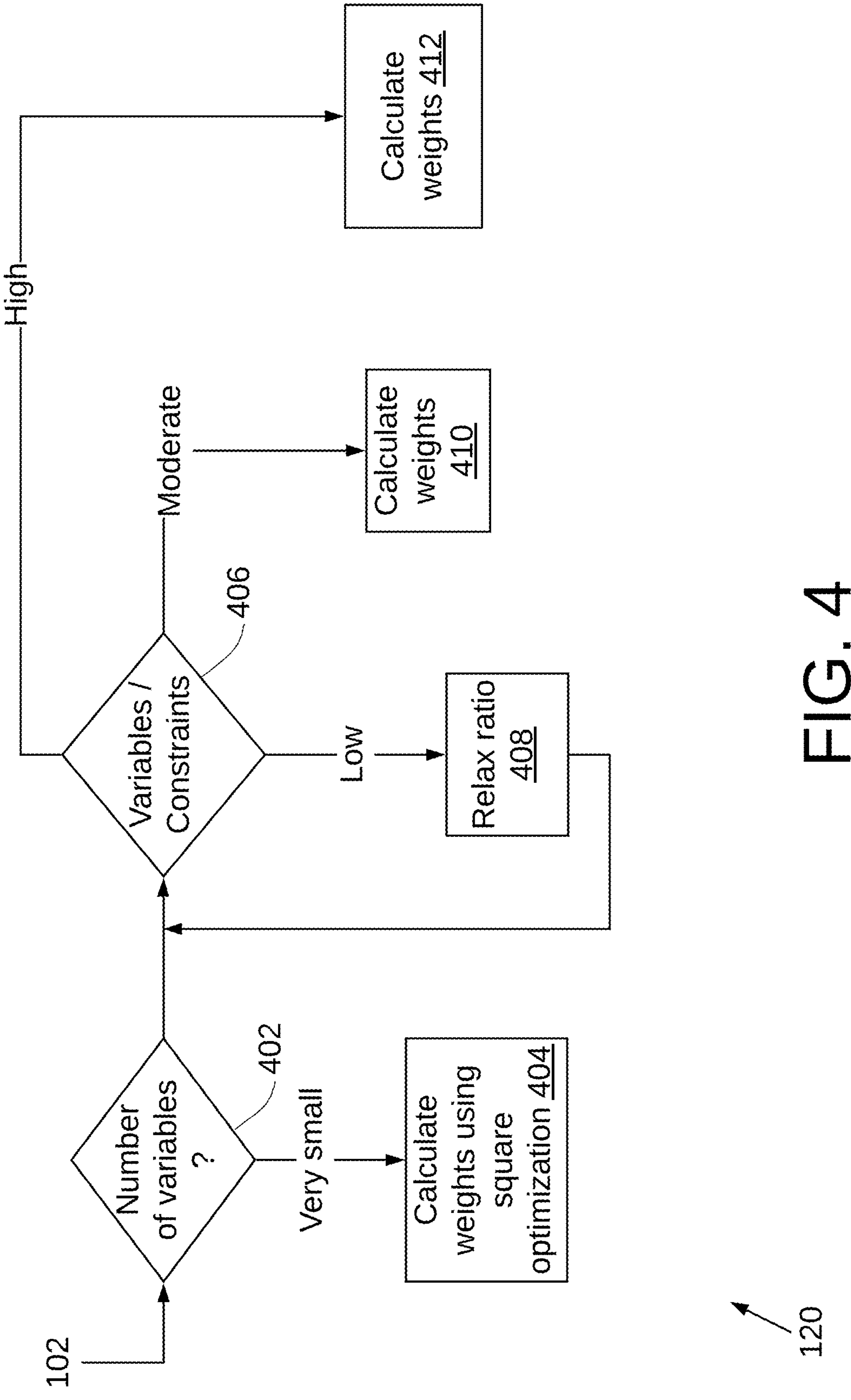
FIG. 4 is a flow diagram illustrating an embodiment of variable and constraint adjustment and calculation.

FIG. 4 is a flow diagram illustrating an embodiment of variable and constraint adjustment and calculation. In FIG. 4 and the accompanying description, an input 102 corresponds to a variable. The operations in FIG. 4 test the number of variables inputted into the system 10 along with the number of constraints imposed on the input variables and responds accordingly, in one of three ways. At 402, the number of variables input into the system 10 is tested against an adjustable variable threshold. If the number of variables input into the system 10 is below (and in some embodiments equal to) the adjustable variable threshold then weight calculation is performed at 404 in one embodiment in accordance with square optimization. As will be appreciated by those skilled in the art in view of the present disclosure, a square is the shape that maximizes an area defined by a given perimeter constraint, which in this case is the number of variables provided to the system 10. In such an operation, the weight of a variable is set to be equal to its optimal score. For example, on a score range of zero to one, if the optimal score for a variable, for example, height, is one, then the weighting is set to a value of one, similarly if the optimal score for a variable is set to 0.1 on a score range of zero to one then the weighting is set to a value of 0.1.

If the number of variables input into the system 10 is above (and in some embodiments equal to) the adjustable variable threshold then at 406 the ratio of variables to constraints is tested. If the ratio of variables to constraints is below (and in some embodiments equal to) a lower adjustable variable/constraint ratio then at 408 an operation is performed to relax the ratio to increase the ratio of variables to constraints. The operation at 408 causes the number of variables to increase, or the number of constraints to decrease or both. This is performed iteratively until the ratio of variables to constraints is above (and in some embodiments equal to) the lower adjustable variable/constraint ratio, at which point a test is performed to determine if the ratio of variables to constraints is below (and in some embodiments equal to) an upper adjustable variable/constraint ratio. This will be the case where the ratio was just relaxed at 408 but will not necessarily be the case if the threshold imposed by the lower adjustable variable/constraint ratio was met on the first pass. The lower and upper adjustable variable/constraint ratios together impose a variable/constraint ratio range that should be met before the variables provided to the system 10 are solved for at 410.

At 410, in one embodiment, the weight factors 202 assigned to each processing node 106 are calculated by back propagation. At each layer the number of weights is equal to the number of edges coming out of the nodes. Each edge is associated with a unique weight and these form the variables. Each function provides a score $n_i$ for the nth function applied to element i. Given the weights $x_1$ through $x_n$ and with the objective of reaching the scores $S_1$ through Sn the system solves this set of equations using Eigen Vectors that are augmented by applying a diagonal matrix as shown below with the objective of getting as close as possible to the ranked set of scores. In the below equations, a through m represents the inputs and x represents the weights.

$$\begin{bmatrix} a_1 & a_2 & a_3 & \dots & a_n \\ b_1 & b_2 & b_3 & \dots & b_n \\ c_1 & c_2 & c_3 & \dots & c_n \\ \dots & \dots & \dots & \dots & \dots \\ m_1 & m_2 & m_3 & \dots & m_n \end{bmatrix} \begin{bmatrix} x_1 \\ x_2 \\ x_3 \\ \dots \\ x_n \end{bmatrix} =$$

$$\begin{bmatrix} a_1x_1 + & a_2x_2 + & a_3x_3 + & \dots & + & a_nx_n \\ b_1x_1 + & b_2x_2 + & b_3x_3 + & \dots & + & b_nx_n \\ c_1x_1 + & c_2x_2 + & c_3x_3 + & \dots & + & c_nx_n \\ \dots & \dots & \dots & \dots & + & \dots \\ m_1x_1 + & m_2x_2 + & m_3x_3 + & \dots & + & m_nx_n \end{bmatrix} = \begin{bmatrix} S_1 \\ S_2 \\ S_3 \\ \dots \\ S_n \end{bmatrix}$$

This set of equations may have more than one solution. To select the optimal result, pareto optimization may be used to measure the distance of every element to the conceptual ideal. This minimizes the changes from the previous set of weights.

If the variable/constraint ratio is above (and in some embodiments equal to) the upper adjustable variable/constraint ratio at 406 then at 412 weight calculation is performed in the manner described below, which differs from the weight calculation at 410. In one embodiment, the calculation at 412 may be performed using pareto optimization. As will be appreciated by those skilled in the art in view of the present disclosure, the pareto principle recognizes that for many events, most effects (e.g. 80%) arise from a relatively small number (e.g. 20%) of causes. Pareto optimization, in one embodiment may be performed in accordance with the relationship expressed below:

$$\nabla_{x,y} f = \lambda \nabla_{x_j y} g$$

for some λ where $$\nabla_{x,y} f = \left(\frac{\partial f}{\partial x}, \frac{\partial f}{\partial y}\right), \nabla_{x,y} g = \left(\frac{\partial g}{\partial x}, \frac{\partial g}{\partial y}\right)$$

In multi-objective optimization, optimal solutions lie near the pareto optimal frontier (boundaries). This frontier in a multivariate environment represents the intersection of graphs/planes. This usually coincides with a corner of a parametric query. In one embodiment, the pareto optimization is performed as a two-step operation where a matrix as shown below is first augmented and is then optimized in accordance with a LaGrange transformation.

$$\begin{bmatrix} a_1 & a_2 & a_3 & \dots & a_n \\ b_1 & b_2 & b_3 & \dots & b_n \\ c_1 & c_2 & c_3 & \dots & c_n \\ \dots & \dots & \dots & \dots & \dots \\ m_1 & m_2 & m_3 & \dots & m_n \\ 1 & 0 & 0 & \dots & 0 \\ 0 & 1 & 0 & \dots & 0 \\ 0 & 0 & 1 & \dots & 0 \\ \dots & \dots & \dots & \dots & \dots \\ 0 & 0 & 0 & \dots & 1 \end{bmatrix} \begin{bmatrix} x_1 \\ x_2 \\ x_3 \\ \dots \\ x_n \end{bmatrix} = \begin{bmatrix} S_1 \\ S_2 \\ S_3 \\ \dots \\ S_n \\ R_1 \\ R_2 \\ R_3 \\ \dots \\ R_n \end{bmatrix}$$

As seen, the above matrix $a_1$ through $m_n$ is augmented by doubling its size with a series of ones along the diagonal. The result is then optimized in accordance with the LaGrange transformation shown above to cause the variable/constraint ratio to fall below (and in some embodiments equal to) the upper adjustable variable/constraint ratio at 406.

Figure 5:
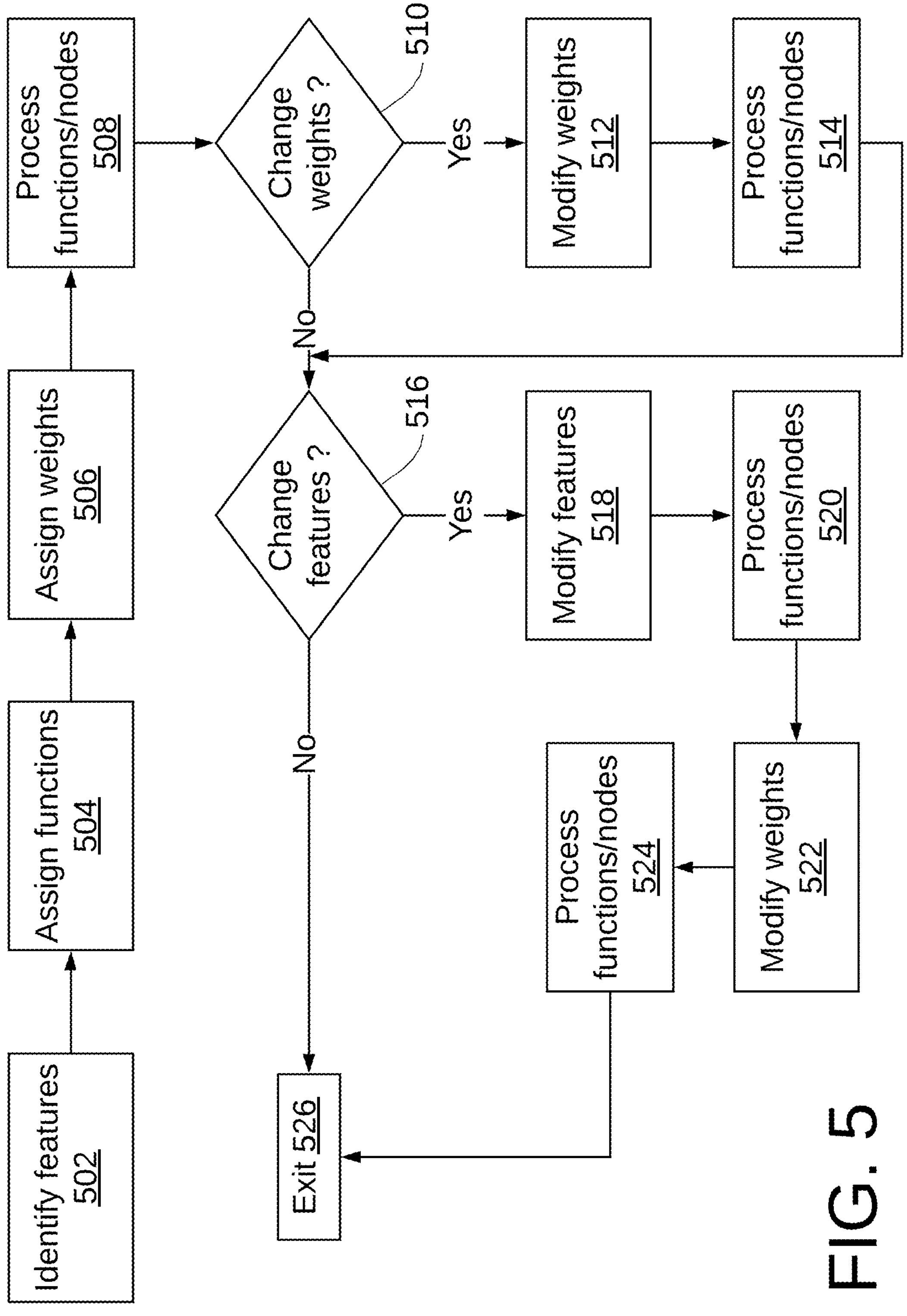
FIG. 5 is a flow diagram illustrating operation of the machine learning system.

FIG. 5 is a flow diagram illustrating operation of an embodiment of the machine learning system and which provides an overview of the operations explained in conjunctions with FIGS. 1-4 to configure the system 10 for a particular application. For a given application, the features are first identified at 502. These features correspond to data in the data storage 104 and provide the inputs to the system 10. At 504 a function 110 for each processing node 106 in each processing layer 108 is identified. This requires determining the number of processing layers 108 and number of processing nodes 106 in each processing layer 108. Initial weights are assigned at 506 to each processing node in each processing layer other than the first layer (108.1). This may be a default system assigned weight, such as equally assigning a weight to an edge 118. For example, with n features (inputs), each edge may be assigned a default weight of 1/n. The features are then processed at 508 by executing each function 110 at each processing node in the first processing layer 108.1 and then at the next processing layer 108.2 until each processing layer has executed to generate results 116, which is typically in the form of a classification. The weights are then checked at 510 to determine if changes need to be made. This may be the case if the results 116 do not meet expected results. This is typically the case on the first pass in which operation 508 is performed for a given set of functions 110. In general, the weights for any given set of functions 110 will not need to be changed too many times. If the weights are to be modified that is done so at 512 by way of the operations shown in FIG. 4 and explained in the accompanying description. In one embodiment, the weights are modified starting from the last processing layer 108 (such as for example 108.3) in other words the processing layer that provides the results 116, and then proceeding backwards through the processing layers to the first processing layer (such as for example 108.1). If the weights do not need to be changed then at 516 a test is performed to determine if any of the features 110 need to be changed. As with the weight associated determination at 510 the feature associated determination at 514 may be performed if the results 116 do not meet expected results. This is typically the case on the first pass for a first set of functions 110 in which operation 508 is performed. In general, the features for any given application will not need to be changed too many times. If the features are determined at 516 to require modification, then one or more features are changed at 518 such as by performing the operations shown in FIG. 3 and explained in the accompanying description. In one embodiment, the weights are modified starting from the first processing layer 108 (such as for example 108.1) in other words the processing layer that receives the inputs 102, and then proceeding forward through the processing layers to the last processing layer (such as for example 108.3) which provides the results 116. Upon weight modification at 512 the functions at each of the nodes are executed, as is the case at 520 upon modification of features 518. In the event that the functions at the nodes are executed at 520 the weights are again modified at 522 and the functions at the nodes are processed at 524. Upon exit at 526 the system 10 is configured to process and to classify data for the particular application for which functions and weights are determined as shown and explained in connection with FIG. 5.

The system 10, by employing a specific set of functions 110, permits an explanation of why a particular set of inputs (features) 102 results in a particular classification, i.e. set of results 116. To discover the why, one traverses the processing layers 108 backwards i.e. discover through the various nodes that affect the score of a feature. As each node 106 is associated with a known function 110 an understanding can be gained as to the reason for a certain classification for a certain set of inputs. Such insight is gained by traversing the processing layers backward and measuring at what point (or edge in case of a neural network model), in the process (in the layers) did the score get a boost (gain or loss). And identifying the node(s) at which the change occurred. With this process, one or more nodes may be identified. These nodes will "tell the story". In the case of detecting the risk of cancer, for example, not only will the disclosed system generate a score that will assess the risk of cancer, but it will also be able to provide a reasoning behind its score. So, for example, if the node that encapsulated the function of a cell mutation due to radiation exposure and consumption of antidepressant was the main cause of the change in score then the conclusion and insight will be provided.

Alternatively, in another embodiment, the system 10 may interact with the user and ask them about their input, whether it is their sentiment or preferences, which would yield a very personalized response. For example, understanding the importance of safety in a car for a given prospective buyer has no parallel, either in rule-based systems or in SQL modeling, or AI/ML.

In summary, use of the different functions 110 in a single engine provides a number of benefits. First, as explained above, the system is able to provide insight into the result. Moreover, the extensive data required for traditional AI/ML systems is in certain cases sharply reduced as the business functions are able to employ prior learning in the decision-making process. By applying logic, the disclosed system can also create new labels (outcomes). Use of granular functions permits different combinations to provide new outcomes. The system also permits building of a framework that incorporates a library of functions.

Figure 6:
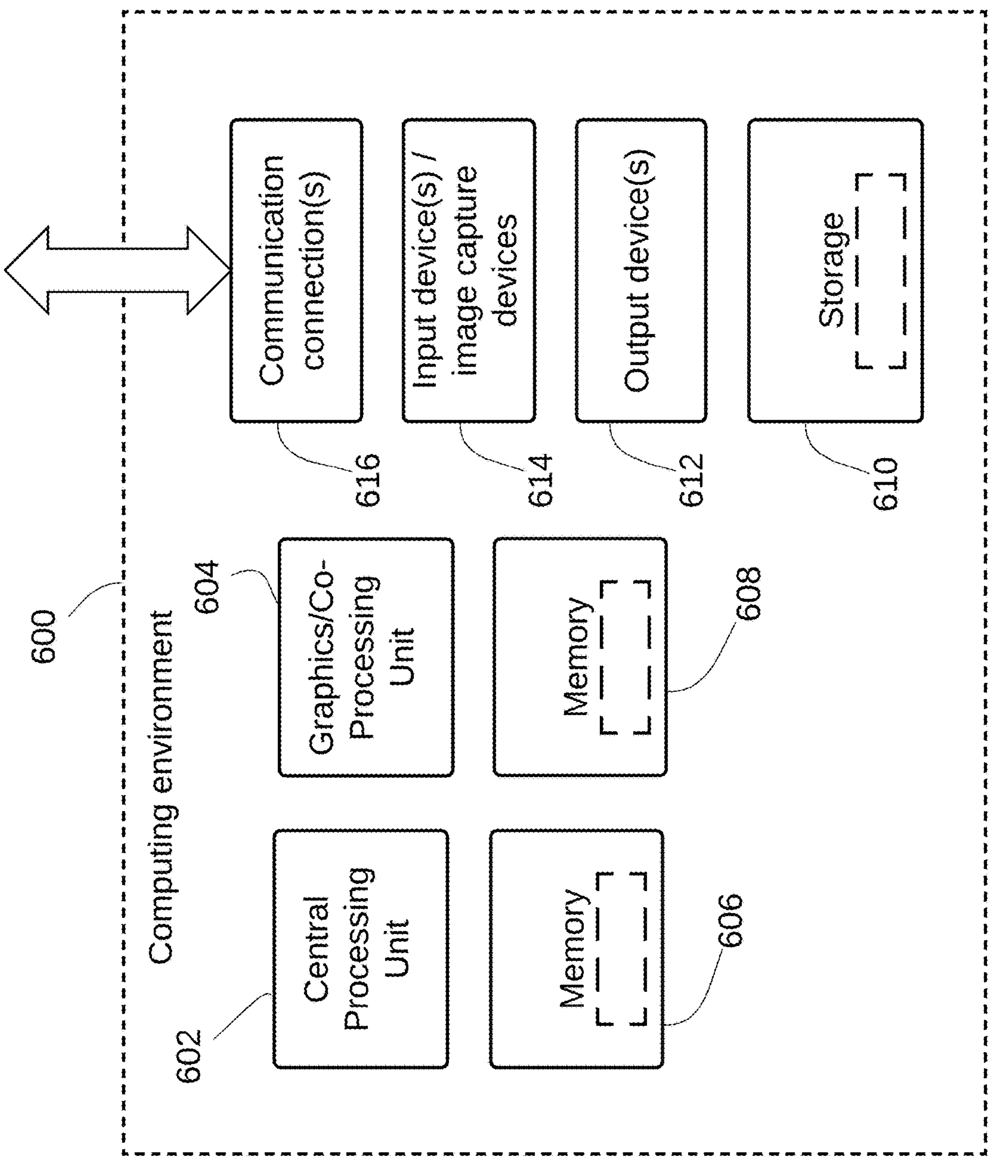
FIG. 6 illustrates a block diagram of hardware that may be employed in an implementation of the systems disclosed herein.

The embodiments herein can be implemented in the general context of computer-executable instructions, such as those included in program modules, being executed in a computing system on a target real or virtual processor, each of which may constitute a server processor. Each processing node 106 may be a physical processor such as shown in FIG. 6 and explained in connection therewith. In another embodiment, each processing node 106 may also comprise a virtual processor. In another embodiment, each processing node 106 may be the same as a function 110 which may be implemented as a program module. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

FIG. 6 illustrates a block diagram of hardware that may be employed in an implementation of the system as disclosed herein. FIG. 6 depicts a generalized example of a suitable general-purpose computing system 600 in which the described innovations may be implemented in order to improve the processing speed and efficiency with which the computing system 600 operates to perform the functions disclosed herein. With reference to FIG. 6 the computing system 600 includes one or more processing units 602, 604 and memory 606, 608. The processing units 602, 606 execute computer-executable instructions. A processing unit can be a general-purpose central processing unit (CPU), processor in an application-specific integrated circuit (ASIC) or any other type of processor. The tangible memory 606, 608 may be volatile memory (e.g., registers, cache, RAM), non-volatile memory (e.g., ROM, EEPROM, flash memory, etc.), or some combination of the two, accessible by the processing unit(s). The hardware components in FIG. 6 may be standard hardware components, or alternatively, some embodiments may employ specialized hardware components to further increase the operating efficiency and speed with which the system 10 operates. The various components of computing system 600 may be rearranged in various embodiments, and some embodiments may not require nor include all of the above components, while other embodiments may include additional components, such as specialized processors and additional memory.

Computing system 600 may have additional features such as for example, storage 610, one or more input devices 614, one or more output devices 612, and one or more communication connections 616. An interconnection mechanism (not shown) such as a bus, controller, or network interconnects the components of the computing system 600. Typically, operating system software (not shown) provides an operating system for other software executing in the computing system 600, and coordinates activities of the components of the computing system 600.

The tangible storage 610 may be removable or non-removable, and includes magnetic disks, magnetic tapes or cassettes, CD-ROMs, DVDs, or any other medium which can be used to store information in a non-transitory way, and which can be accessed within the computing system 600. The storage 610 stores instructions for the software implementing one or more innovations described herein.

The input device(s) 614 may be a touch input device such as a keyboard, mouse, pen, or trackball, a voice input device, a scanning device, or another device that provides input to the computing system 600. For video encoding, the input device(s) 614 may be a camera, video card, TV tuner card, or similar device that accepts video input in analog or digital form, or a CD-ROM or CD-RW that reads video samples into the computing system 600. The output device(s) 612 may be a display, printer, speaker, CD-writer, or another device that provides output from the computing system 600.

The communication connection(s) 616 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a certain embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computer-implemented method for processing data that represents one or more entities to be classified for a computerized application characterized by one or more features, the computer-implemented method, comprising:

receiving data provided by the computerized application from computerized data storage, the data organized as a plurality of first layer inputs, wherein data corresponding to each first layer input represents a different feature of an entity to be classified;

processing each of the plurality of first layer inputs with one or more processing layers wherein each processing layer comprises one or more computerized processing nodes wherein each of the computerized processing nodes executes a function;

the processing layers comprising a first processing layer comprising a plurality of the computerized processing nodes wherein each of the first layer inputs is provided to a predetermined one of the computerized processing nodes in the first processing layer wherein each of the computerized processing nodes in the first processing layer processes its first layer input in accordance with a set of predefined functions that is contextual with respect to the first layer input, wherein at least a subset of the set of predefined functions is specific to relationships exhibited by the data provided by the computerized application, and wherein the at least the subset of functions is separate from mathematical relationships between inputs to the at least the subset of functions and outputs of the at least the subset of functions, each of the computerized processing nodes in the first processing layer providing a first layer output to each processing node in a second processing layer;

each of the computerized processing nodes in the second processing layer accepting as second layer inputs each first layer output of the computerized processing nodes of the first processing layer, weighting each second layer input with a corresponding initial weighting, processing the second layer inputs as weighted with the corresponding initial weighting in accordance with a predefined function which varies among the computerized processing nodes in the second processing layer, and providing a second layer output; and providing the second layer output of each of the computerized processing nodes in the second processing layer to each processing node in a third processing layer;

each of the computerized processing node in the third processing layer accepting as third layer inputs each second layer output of the computerized processing nodes of the second processing layer, weighting each third layer input with a corresponding third layer weighting, processing the third layer inputs as weighted with the corresponding initial third layer weighting in accordance with a predefined function which varies among the computerized processing nodes in the third processing layer, and providing a third layer output; and providing the third layer output of each computerized processing node in the third processing layer as a result that provides for the computerized application a classification of the entity to be classified, wherein processing speed and efficiency of the computerized application and the classification are improved.

2. A computerized decision engine, comprising a processor that executes instructions that when executed comprise:

a receiving layer comprising one or more computerized processing nodes that execute computer-executable instructions to receive one or more sets of data organized as a plurality of inputs as generated by a computerized application characterized by one or more features, wherein each input of the plurality of inputs comprises one or more of the features and wherein each of the computerized processing nodes in the receiving layer processes one of the plurality of inputs in accordance with a function that has a contextual relationship with the one or more features of the one of the plurality of inputs processed by the function, wherein each contextual relationship is specific to a feature of the computerized application; and a second layer comprising one or more computerized processing nodes that each execute computer-executable instructions to provide a set of context specific functions, responsive to the inputs, wherein each function of the set of context specific functions provides a known normalized output in response to one or more weighted inputs, wherein at least one computerized processing node of the second layer executes a context specific function that remains unchanged during learning by the computerized decision engine and that differs from the context specific function executed by each other computerized processing node of the second layer, wherein each context specific function exhibits a relationship between an input to the context specific function and an output of the context specific function that is separate from a mathematical relationship between the input to the context specific function and the output of the context specific function, the computerized processing nodes of the second layer providing in response to the inputs output data of the computerized decision engine to the computerized application in the form of a set of outputs, wherein processing speed and efficiency of the computerized decision engine and the classification are improved.

3. The computerized decision engine of claim 2 wherein the processor further executes instructions that perform dynamic assignment by:

for each selected node of the computerized processing nodes of the second layer, dynamically selecting the context specific function, from a function library by selecting a first selected context specific function and successively adjusting the first selected context specific function until the first selected context specific function fits factors that impact the selected node, for each set of data, wherein the function library is available to all computerized processing nodes.

4. The computerized decision engine of claim 2 wherein the context specific function corresponding to at least one computerized processing node of the second layer is maintained for more than one set of data processed by the computerized decision engine.

5. A computerized decision engine responsive to a computerized application characterized by a plurality of features, the computerized decision engine comprising:

data storage having stored therein, data corresponding to a plurality of entities, each entity of the plurality of entities comprising data corresponding to the plurality of features; and a plurality of utility functions;

one or more server processors operatively coupled to the data storage and configured to execute instructions that when executed cause the one or more server processors to:

implement a plurality of data processing layers, each data processing layer comprising a plurality of computerized processing nodes, the data processing layers comprising a receiving layer, a first intermediate layer and a final layer;

receive at each of the computerized processing nodes in the receiving layer an input in the form of a feature corresponding to an entity for classification and process each input in accordance with a function executed by one of the computerized processing nodes in the receiving layer where the function has a contextual relationship with features of the input processed by the function and where the function is specific to characteristics of the data corresponding to the plurality of entities wherein the function is separate from mathematical relationships between inputs to the function and outputs of the function;

at each of the computerized processing nodes in the first intermediate layer receive each output of each of the computerized processing nodes in the receiving layer, execute a utility function selected from among the utility functions stored in the data storage such that of the computerized processing nodes in the first intermediate layer, at least one computerized processing node executes a utility function that is different from the utility function executed by each other computerized processing node in the first intermediate layer and wherein the utility function executed by the at least one computerized processing node, and weight each input in accordance with a corresponding predefined weight;

and receive at each of the computerized processing nodes in the final layer an output of each of the computerized processing nodes of the first intermediate layer and provide to the computerized application a classification result to classify the entity for classification, wherein processing speed and efficiency of the computerized decision engine and the classification are improved.

6. The computerized decision engine of claim 5 wherein the operation to weight each input in accordance with a corresponding predefined weight comprises:

automatically modifying certain weights corresponding to certain inputs of one or more of the computerized processing nodes in the first intermediate layer.

7. The computerized decision engine of claim 5 wherein the operation to execute a utility function selected from among the utility functions stored in the data storage comprises:

automatically modifying certain functions in certain of the computerized processing nodes of the first intermediate layer.

8. The computerized decision engine of claim 3 wherein the processor further executes instructions that when executed cause the dynamic assignment to:

(i) generate a data structure that identifies a function performed by each computerized processing node and that identifies a source of each input for the function performed by each computerized processing node and a weight assigned to the source;

(ii) determine edge relevance for each input by comparing a value of each input to an adjustable edge relevance threshold value;

(iii) store the value of each input that is greater than the adjustable edge relevance threshold value; and (iv) evaluate each computerized processing node containing a function having a value of an input that is less than the adjustable edge relevance threshold value to modify the function performed by the computerized processing node.

9. The computerized decision engine of claim 8 wherein the processor further executes instructions that when executed cause the dynamic assignment to repeat operations (ii), (iii) and (iv) a plurality of times to iteratively modify the function performed by the computerized processing node.

10. The computerized decision engine of claim 3 wherein the processor further executes instructions that when executed cause the dynamic assignment to:

(i) determine if an input number value corresponding to the number of the inputs is less than an adjustable variable threshold and if the input number value is less than the adjustable variable threshold then calculating a weight for each input in accordance with square optimization; and (ii) if the input number value is greater than the adjustable variable threshold then determining an input/constraint ratio of the input number value to a constraint value corresponding to a number of constraints imposed on the inputs and if the input-constraint ratio is below a lower adjustable input/constraint ratio then increasing the input/constraint ratio.

11. The computerized decision engine of claim 10 wherein the processor further executes instructions that when executed cause the dynamic assignment to repeat operations (i) and (ii) until the input/constraint ratio is between the lower adjustable input/constraint ratio and an upper adjustable input/constraint ratio.

12. The computerized-implemented method of claim 1 further comprising performing operations to:

(i) generate a data structure that identifies a function performed by each computerized processing node and that identifies a source of each input for the function performed by each computerized processing node and a weight assigned to the source;

(ii) determine edge relevance for each input by comparing a value of each input to an adjustable edge relevance threshold value;

(iii) store the value of each input that is greater than the adjustable edge relevance threshold value; and (iv) evaluate each computerized processing node containing a function having a value of an input that is less than the adjustable edge relevance threshold value to modify the function performed by the computerized processing node.

13. The computerized-implemented method of claim 12 further comprising performing operations to: repeat operations (ii), (iii) and (iv) a plurality of times to iteratively modify the function performed by the computerized processing node.

14. The computerized-implemented method of claim 1 further comprising performing operations to:

(i) determine if an input number value corresponding to the number of the inputs is less than an adjustable variable threshold and if the input number value is less than the adjustable variable threshold then calculating a weight for each input in accordance with square optimization; and (ii) if the input number value is greater than the adjustable variable threshold then determining an input/constraint ratio of the input number value to a constraint value corresponding to a number of constraints imposed on the inputs and if the input-constraint ratio is below a lower adjustable input/constraint ratio then increasing the input/constraint ratio.

15. The computerized-implemented method of claim 14 further comprising performing operations to: repeat operations (i) and (ii) until the input/constraint ratio is between the lower adjustable input/constraint ratio and an upper adjustable input/constraint ratio.

16. The computerized decision engine of claim 5 wherein the one or more server processors are configured to execute instructions that when executed cause the one or more server processors to:

(i) generate a data structure that identifies a function performed by each of the computerized processing nodes and that identifies a source of each input for the utility function performed by each of the computerized processing nodes and a weight assigned to the source;

(ii) determine edge relevance for each input by comparing a value of each input to an adjustable edge relevance threshold value;

(iii) store the value of each input that is greater than the adjustable edge relevance threshold value; and (iv) evaluate each computerized processing node containing a utility function having a value of an input that is less than the adjustable edge relevance threshold value to modify the utility function performed by the computerized processing node.

17. The computerized decision engine of claim 16 wherein the one or more server processors are configured to execute instructions that when executed cause the one or more server processors to repeat operations (ii), (iii) and (iv) a plurality of times to iteratively modify the utility function performed by the computerized processing node.

18. The computerized decision engine of claim 5 wherein the one or more server processors are configured to execute instructions that when executed cause the one or more server processors to:

(i) determine if an input number value corresponding to the number of the inputs is less than an adjustable variable threshold and if the input number value is less than the adjustable variable threshold then calculating a weight for each input in accordance with square optimization;

(ii) if the input number value is greater than the adjustable variable threshold then determining an input/constraint ratio of the input number value to a constraint value corresponding to a number of constraints imposed on the inputs and if the input-constraint ratio is below a lower adjustable input/constraint ratio then increasing the input/constraint ratio; and (iii) repeat operations (i) and (ii) until the input/constraint ratio is between the lower adjustable input/constraint ratio and an upper adjustable input/constraint ratio.

* * * * *